(12) United States Patent
Westman et al.

(10) Patent No.: US 11,156,528 B2
(45) Date of Patent: Oct. 26, 2021

(54) WIND TUNNEL FOR HUMAN FLIGHT

(71) Applicant: Inclined Labs AB, Bromma (SE)

(72) Inventors: Anton Westman, Ska (SE); Peter Georen, Solna (SE); Johan Stromberg, Danderyd (SE)

(73) Assignee: Inclined Labs AB, Bromma (SE)

( * ) Notice: Subject to any disclaimer, the term of this patent is extended or adjusted under 35 U.S.C. 154(b) by 0 days.

(21) Appl. No.: 16/588,299

(22) Filed: Sep. 30, 2019

(65) Prior Publication Data

US 2020/0041376 A1 Feb. 6, 2020

Related U.S. Application Data

(62) Division of application No. 15/433,292, filed on Feb. 15, 2017, now Pat. No. 10,429,270.

(30) Foreign Application Priority Data

Feb. 15, 2016 (SE) .................................... 1650199-1

(51) Int. Cl.
*G01M 9/04* (2006.01)
*A63G 31/00* (2006.01)
(Continued)

(52) U.S. Cl.
CPC ............... *G01M 9/04* (2013.01); *A63G 31/00* (2013.01); *A63G 31/16* (2013.01); *G09B 9/00* (2013.01);
(Continued)

(58) Field of Classification Search
CPC .. G01M 9/04; G01M 9/02; G09B 9/00; F28D 1/053; F28D 7/1615; F28F 2250/02; F28F 1/02; A63G 2031/005; A63G 31/00
See application file for complete search history.

(56) References Cited

U.S. PATENT DOCUMENTS

| | | |
|---|---|---|
| 1,635,038 A | 7/1927 | Fales |
| 1,947,962 A | 2/1934 | Alfaro |
| | (Continued) | |

FOREIGN PATENT DOCUMENTS

| | | |
|---|---|---|
| DE | 4241574 C1 | 3/1994 |
| DE | 102013007143 A1 | 10/2014 |
| | (Continued) | |

*Primary Examiner* — Nimeshkumar D Patel
*Assistant Examiner* — Gedeon M Kidanu
(74) *Attorney, Agent, or Firm* — Harness, Dickey & Pierce, P.L.C.

(57) ABSTRACT

A wind tunnel for stable sustained human flight for research or recreation, including a tunnel including first and second portions having first and second central axes, respectively, and a fan to create an air flow in the test section. The second portion is a test section. The first and second central axes are arranged at a first angle with respect to each other. The second central axis is at a second angle of 5°-85° with respect to a horizontal plane. A safety system for an inclined wind tunnel for stable sustained human flight is provided, including an inclined test section of the wind tunnel that is arranged at an angle of 5°-85° with respect to a horizontal plane, a fan to create an air flow in the test section directed from an upstream end towards a downstream end thereof, and a delimiting arrangement arranged at the test section for preventing a person using the test section from leaving it.

18 Claims, 11 Drawing Sheets

(51) Int. Cl.
  *A63G 31/16* (2006.01)
  *G09B 9/00* (2006.01)
  *B64D 23/00* (2006.01)
  *G01M 9/02* (2006.01)

(52) U.S. Cl.
  CPC ........ *A63G 2031/005* (2013.01); *B64D 23/00* (2013.01); *G01M 9/02* (2013.01)

(56) References Cited

U.S. PATENT DOCUMENTS

| | | | |
|---|---|---|---|
| 3,276,251 | A | 10/1966 | Reed, III |
| 5,209,702 | A | 5/1993 | Arenas |
| 5,975,907 | A | 11/1999 | Advani |
| 6,390,234 | B1 | 5/2002 | Boyer |
| 7,156,744 | B2 * | 1/2007 | Metni .................... A63G 31/00 472/137 |
| RE43,028 | E | 12/2011 | Kitchen et al. |
| 9,327,202 | B2 * | 5/2016 | Lurie ....................... G09B 9/00 |
| 2003/0113695 | A1 * | 6/2003 | Lee ........................ A63G 31/00 434/258 |
| 2003/0211806 | A1 | 11/2003 | Paterson |
| 2006/0025227 | A1 | 2/2006 | Metni et al. |
| 2010/0137069 | A1 | 6/2010 | Petruk |
| 2015/0375125 | A1 * | 12/2015 | Lurie ..................... A63G 31/00 472/49 |

FOREIGN PATENT DOCUMENTS

| | | | | |
|---|---|---|---|---|
| GB | 2062557 | A | 5/1981 | |
| NZ | 568424 | A * | 3/2010 | ............. G01M 9/02 |
| NZ | 20080568424 | A | 3/2010 | |
| WO | WO-2017103768 | A1 * | 6/2017 | ............. A63G 31/00 |
| WO | WO-2018015766 | A1 * | 1/2018 | ............. A63G 31/00 |

* cited by examiner

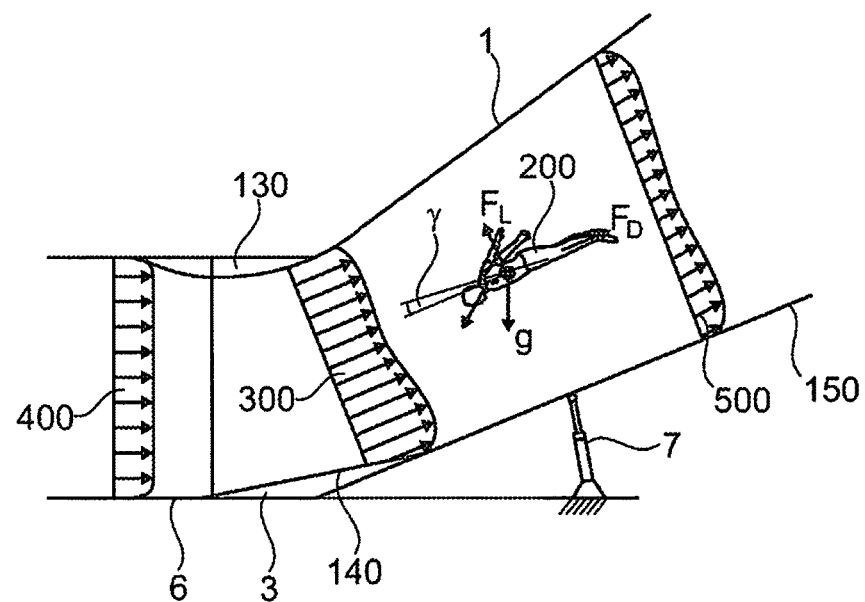
Fig. 3
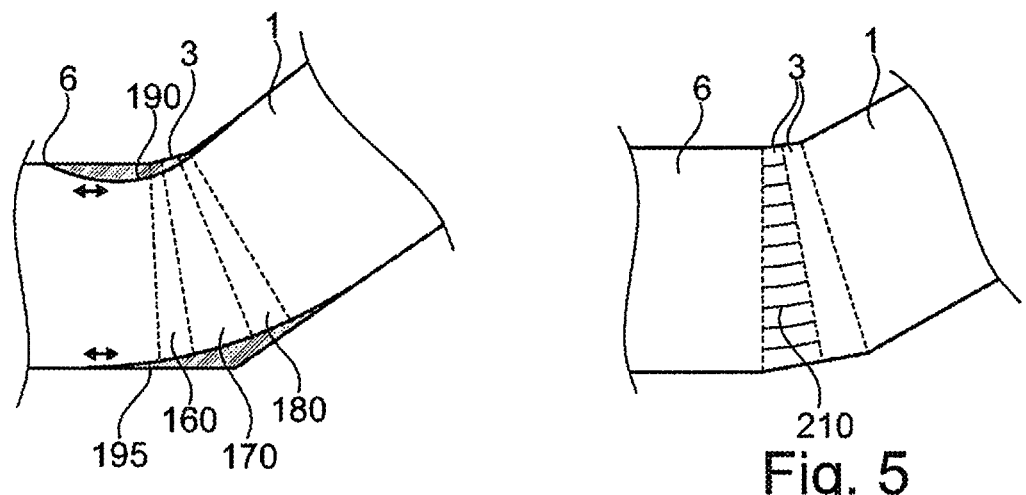
Fig. 4
Fig. 5

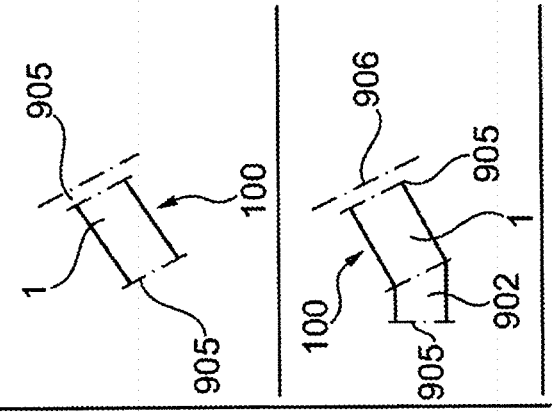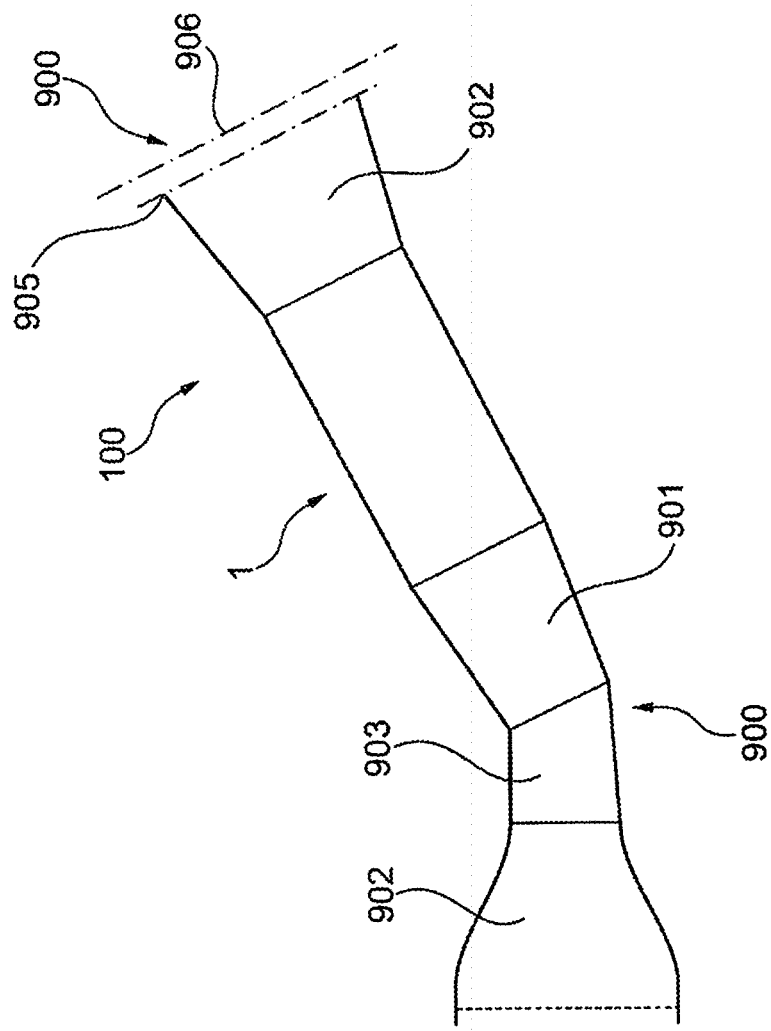

WIND TUNNEL FOR HUMAN FLIGHT

CROSS-REFERENCE TO RELATED APPLICATIONS

This is a continuation of, and claims priority under 35 U.S.C. § 120 to, U.S. application Ser. No. 15/433,292, filed on Feb. 15, 2017, which claims priority under 35 U.S.C. § 120 to Swedish Application No. 16501991, filed Feb. 15, 2016, the entire contents of each of which are incorporated herein in their entirety by reference.

TECHNICAL FIELD

The present invention relates to a wind tunnel for human flight for research or recreation, comprising
 a tunnel having a first portion with a first central axis and a second portion having a second central axis, wherein the second portion is a test section,
 said first central axis and said second central axis being arranged at a first angle with respect to each other, and
 at least one fan for creating an air flow in the test section.
The invention also relates to a safety system for an inclined wind tunnel.

BACKGROUND ART

Horizontal wind tunnels have, for over a century, been used to study the flow of air around objects; particularly flying objects. As early as 1901, Orville and Wilbur Wright anchored miniaturized wing profiles in a horizontal tube and exposed them to airflows, to study their airfoil characteristics, drag force and lift force. This simple method to simulate flight without actually flying has played a central role in the development of modern aircraft and other devices exposed to airflows. Modern horizontal wind tunnels typically have a closed tunnel circuit, recirculating air propelled by a fan system. The recirculation has advantages such as conserving energy and minimizing noise emissions outside the tunnel. In fast-flow operations, a cooling system is needed since the recirculating air maintains energy and therefore gradually rises in temperature. Typically, the recirculating wind tunnel system is designed as a circuit of rectangular shape with 90 degree corners. The part of the wind tunnel used for study, usually called the "test section", is considered to be dimensioning of the entire tunnel system, the main parameters being duct width (W) and length (L). In modern recirculating tunnel systems, the test section is preceded by a contraction section, reducing cross sectional area by a factor in the range of 4-9 in order to produce a high flow rate with high quality (low turbulent intensity and length scale) in the test section, and is usually followed by a first expanding duct section, two 90 degree turns, a fan system, and additional expansion ducts and two 90 degree turns returning to the contraction section. The reason for this system design is a combination of several factors, including aerodynamic efficiency and flow quality in the test section. All in all, the effect of the system design limitations of modern horizontal wind tunnels is that they become very large and very heavy (in the order of 25-50 meters long and tens to hundreds of metric tons in weight), if they are to harbor high flow rates with good quality in a large test section capable of encompassing objects in the size of human bodies.

Another type of wind tunnel, in which the objects are not anchored but float freely, is the vertical wind tunnel, used today mostly for skydiving simulation. By blowing air directly opposite to the direction of the gravitational acceleration, e.g. vertically upwards, a state of force equilibrium may be reached at which an object or person is floating on the cushion of the vertically ascending air current. For this purpose, the vertical rather than the horizontal wind tunnel is suitable, since objects in a vertical wind tunnel cannot fly; an object that starts flying in a vertical wind tunnel will, because of its forward momentum, immediately hit the wall. One could say that a horizontal wind tunnel is suitable for simulating flight without permitting the studied objects to fly freely (this would require active propulsion inside the tunnel with, for example, a propeller or jet engine), and a vertical wind tunnel is suitable for allowing objects to float freely without flying.

U.S. Pat. No. 7,156,744 B2 "Recirculating Vertical Wind Tunnel skydiving simulator" describes a state-of-the-art vertical wind tunnel technology for keeping people floating on a cushion of air. Several other patents describe various vertical wind tunnel designs for sports and recreational purposes, indicating great business value and public interest in this type of recreational device for sport and experience based consumption. The vertical wind tunnel has been an important development in these kinds of sports, but now appears limited by its vertical walls, which like a cage prevents flying for real. In this sports population, it would be desirable with a wind tunnel apparatus that overcomes this limitation and creates conditions for people to experience actual flight, indoors.

Typically, a vertical sports wind tunnel may be circa 30 m high. In an optimal wind tunnel, a test section with a diameter of 4 m would require a height of 54 m, but the designers and manufacturers of vertical sports wind tunnels have tried various technological workarounds to slightly decrease this value, since building permits for such large edifices are difficult to obtain. It is often desirable to place a sports and recreation venue accessible to customers, such as in a shopping mall or close to other sports and recreation venues, but this is difficult if the basic design is a very high tower.

There is therefore clearly a need for improved wind tunnels where human flight can be achieved and it is a benefit if the required height dimension of the tunnel system is smaller than today's vertical sports tunnels. For any type of wind tunnel for human use, a safety system for allowing safe use of the wind tunnel is also needed so that the risk of injury can be kept to a minimum. Previously known safety systems for vertical wind tunnels generally consist of at least one strap or handle fastened to a harness or clothing worn by a person using the tunnel and hand-held by an instructor or other safety personnel. The prior-art safety systems are both costly by requiring a safety instructor for each flyer, less safe, by involving a human as an anchor point, and and limiting in the possible movements that can be performed by the person using the tunnel.

U.S. Pat. No. 3,276,251 "Test unit free flight suspension system" describes a state-of-the-art wind tunnel technology for keeping aircraft models suspended within a wind tunnel test section. Several other patents, such as U.S. Pat. No. 1,947,962 "Aeronautic training apparatus" describe various designs of suspension systems for use in wind tunnel systems. However, none of these are suitable for use as a safety system for human flyers in an inclined wind tunnel, since no prior art describes a technology permitting the full range of three-dimensional movements desired combined with the strict delimiting properties desired, preventing said flyer from leaving the test section or colliding with its inner structures.

SUMMARY OF THE INVENTION

The object of the present invention is to eliminate or at least to minimize the problems described above. This is achieved through a wind tunnel according to the appended independent claim.

The present invention overcomes previous limitations by utilizing a conceptually possible third type of wind tunnel: The inclined, or diagonal, wind tunnel. In the diagonal wind tunnel, the air currents flow obliquely upwards, at an angle to the horizontal plane (the horizontal plane being defined as perpendicular to the direction of gravitational acceleration) that allows for proper, free, sustained gliding flight of unanchored objects or animals. This angle is 5°-85°, preferably 15°-60° to the horizontal plane, corresponding to an angle between the test section of the wind tunnel and a tunnel portion arranged horizontally of 5°-85°, preferably 15°-60°, or a tunnel portion arranged vertically of 30°-75°.

The wind tunnel according to the present invention thus comprises a wind tunnel portion, the test section, which is angled upwards and inclined relative to the rest of the tunnel system, which can be either horizontal or vertical. An aspect of the present invention is to provide a wind tunnel apparatus having a test section (also called a flight chamber) inclined relative to the direction of gravitational acceleration, allowing humans to achieve sustained gliding flight therein. The inclination angle is achieved by redirecting the flow of gas (typically, air) an angle relative to the horizontal plane, only in a section on the suction side of the fan-system of a horizontal or vertical wind tunnel The diagonal wind tunnel is essentially similar to the horizontal wind tunnel in that it simulates real flight, but it shares the property with the vertical wind tunnel that the flying bodies therein do not need support to remain airborne. Depending on the characteristics of the flying body, it would also be desirable that a diagonal wind tunnel for true, sustained, gliding flight could vary both the flow rate and the angle, and have certain variations in its geometry. A low angle and low flow rate would be suitable for a small model plane of balsa wood, whereas a human in a wing suit would require a steeper angle and a higher flow rate, and a human without wing suit would require an even steeper angle to the horizontal plane and in some cases a flow rate of at least 200 km/h for stable, sustained gliding flight in a diagonal wind tunnel. If the geometry of the test section is non-isometric in the longitudinal direction, for example, by expanding to a larger cross-sectional area, this enables capacity to accommodate flying bodies of a greater variety and facilitate the undertaking and further development of flying activities.

A diagonal sports tunnel would not require the same height margin as the vertical wind tunnel discussed above, and may readily be fitted next to, for instance, an escalator in a shopping mall. Theoretically, a diagonal sports tunnel of great capacity may be constructed as having a total height well below 20 m. Compared to a vertical sports tunnel, a diagonal sports tunnel requires a significantly lower energy consumption, since its athletes fly, the air flows creating real lift for the practitioners (particularly if they use a wing suit), which reduces the flow rate required. A reduced energy consumption is a great economic advantage. The reduced flow rates required is an environmental benefit; partly because of the lower energy consumption, and partly through reduced noise levels around in the local area. Reduced flow rates also seem beneficial from an injury risk point of view, compared to the brutal hurricane of a vertical wind tunnel that is required to lift a human being directly opposite to the direction of gravitational acceleration.

Another aspect of the present invention is to provide means to alter the direction of the gas flow from the main flow direction (or plane) in an efficient way (low pressure loss) and providing a suitable flow field after redirection by using either of (or combinations of):

1. Individually adjustable turning vanes. This allows for variable airflows along a vertical gradient within the test section, for example, faster flows at the tunnel bottom.
2. Fixed turning vanes that follow, mechanically, when the test section angle changes.
3. The geometric shape of the test section and its intake/discharge of gas flows, without vanes.

The technological means to achieve 1, 2 and 3 (including examples of geometric shapes), and what is desirable and what different alternatives/embodiments look like, are given in the detailed descriptions and Figures.

Another aspect of the present invention is to provide said means to alter the direction of the gas flow in such a way as to be either fixed in place or capable of being mechanically moved into or out of engaged position, enabling dual use of the main tunnel system: normal operation (e.g. vertical wind tunnel) or said diagonal operation mode. In disengaged mode, said technological means to achieve 1, 2 and 3 would be removed from the main tunnel duct system for it to function unaffected. This aspect enables retrofitting existing horizontal and vertical tunnels with the diagonal tunnel being capable of optional to engage or not.

Another aspect of the present invention is to provide an inclined test section (flight chamber) with a variable inclination angle relative to the horizontal plane (i.e. a plane being perpendicular to the direction of the acceleration of gravity) in a way such that the angle can be dynamically changed during operations, without the other parts of the wind tunnel system being changed, e.g. raised, lowered, or otherwise moved. This provides the means for a dynamic response to the in-flight needs of a flying human in gliding flight, in different positions and modes of flying. The adjustable, variable angle of the test section may be dynamically adjusted depending on the nature of the operations. Based on what is known today about the possible activities that are likely to be sought after (human flight), ranges between 15 and 60° are desirable with respect to the horizontal plane. Mechanical means to achieve a variable angle of the test section are given in the detailed descriptions and Figures.

Another aspect of the present invention is to provide an inclined wind tunnel with dynamically variable rate of the airflow, in a way such that the airflow in the test section can be dynamically changed during operation to meet the in-flight needs of a flying human in gliding flight, in different positions and modes of flying. A variable flow rate may be achieved with the fan system, with adjustable turning vanes or with the geometric shape of the test section and its intake/discharge of gas flows, or a combination of these.

Another aspect of the present invention is to provide a varied, in the flow direction non-isometric flow field in the test section, adapted to the nature of the operations, e.g. to meet the needs of flying humans in gliding flight. This is achieved by means of using non-isometric geometry of the test section (e.g. a downstream expanding section and/or curved walls) and/or the section immediately before (upstream) and/or after (downstream) it, or by means of using adjustable turning vanes in the section upstream of the flight section.

Another aspect of the present invention is to provide a return duct, reconnecting the airflow of the inclined section to the main tunnel loop, and thus to the main flow plane, in order to achieve a recirculating tunnel system, reducing energy consumption, conserving heat, and reducing noise and allowing all-weather operation. Said return duct may include fixed or adjustable turning vanes, or other means, that result in reduced losses in said return duct.

Another aspect of the present invention is to provide an inclined wind tunnel test section having two-stage staging areas (airlock system) adjacent and connected to the flight chamber in such a way that allows people to move between the two without stopping or disturbing the airflow due to pressure changes.

Another aspect of the present invention is to provide an inclined wind tunnel segment having an entry and exit area with airlock system arranged so that people can move into or out of the airflow without stopping the airflow in a safe and well-controlled way. All or various combinations of the above aspects of the invention will solve the challenge to build an inclined wind tunnel of sufficient size and flow capacity to enable lasting gliding flight of animals and objects of human size or larger.

Another aspect of the present invention is to provide a suspension system of straps connected to the tunnel walls (including the tunnel "floor" and tunnel "ceiling"), and connected with an attachment/quick release system to a harness worn by the person using the wind tunnel (the "Flyer"). It may be desirable for some users not to have a quick release system, to minimize the risk of accidental disconnection.

According to one aspect of the safety system, a delimiting arrangement arranged at the test section is provided for preventing a person using the test section from leaving said test section. Advantages and benefits of the safety system are further disclosed below with reference to FIGS. 12-15 and 17-18.

According to another aspect of the safety system, a delimiting arrangement arranged at the test section is provided for preventing contact or collision by the flyer and the circumference of the test section and/or additional flyers. Said arrangement allows for certain sideway and longitudinal movements of the flyer but hinders said contact or collision. Advantages and benefits of the safety system are further disclosed below with reference to FIGS. 12-15 and 17-18.

These and other advantages of the present invention will become readily apparent to the person skilled in the art in view of the detailed description below.

DRAWINGS

The invention will now be described in more detail with reference to the appended drawings, wherein FIG. 1 is a side-view of a wind tunnel according to a preferred embodiment of the present invention, having an inclined wind tunnel section attached to a horizontal tunnel-system.

FIG. 2*a* is a side view of an inclined wind tunnel section attached to a vertical tunnel-system.

FIG. 2*b* is a side view of an inclined wind tunnel section attached to a vertical tunnel-system with a simplified return duct design.

FIG. 3 is a side-view of the inclined flight section, showing a human in sustained gliding flight, as well as aerodynamic flow profiles and some technical features of the present invention attached to a horizontal tunnel system.

FIG. 4 is a side view showing details of a flexible connecting portion between the inclined flight section and the main tunnel system, in the case it being horizontal.

FIG. 5 is a side-view of the attachment section connecting the inclined flight section to the main tunnel (horizontal in this picture) and specifically the implementation of flow-guiding "turning vanes".

Figure 8A:
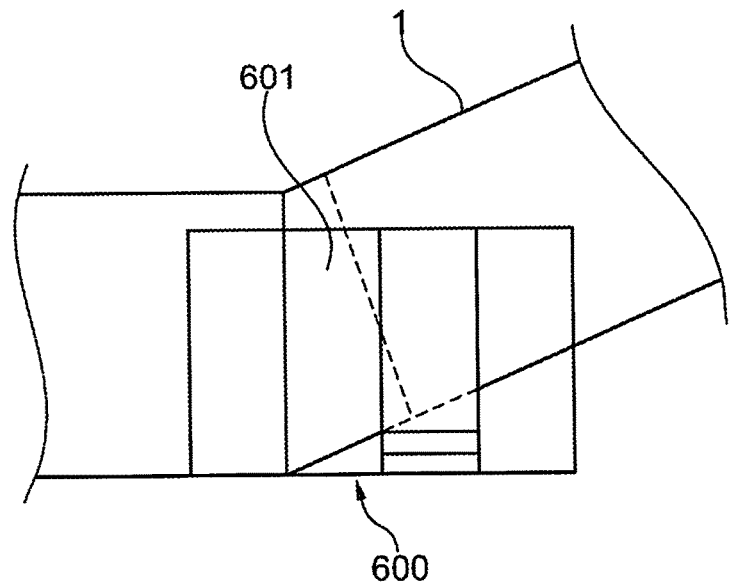

FIGS. 8*a* and *b* shows side and top views, respectively, of a two-stage "double-airlock" staging system for entry and exit of humans or objects to the inclined flight section.

Figure 9:
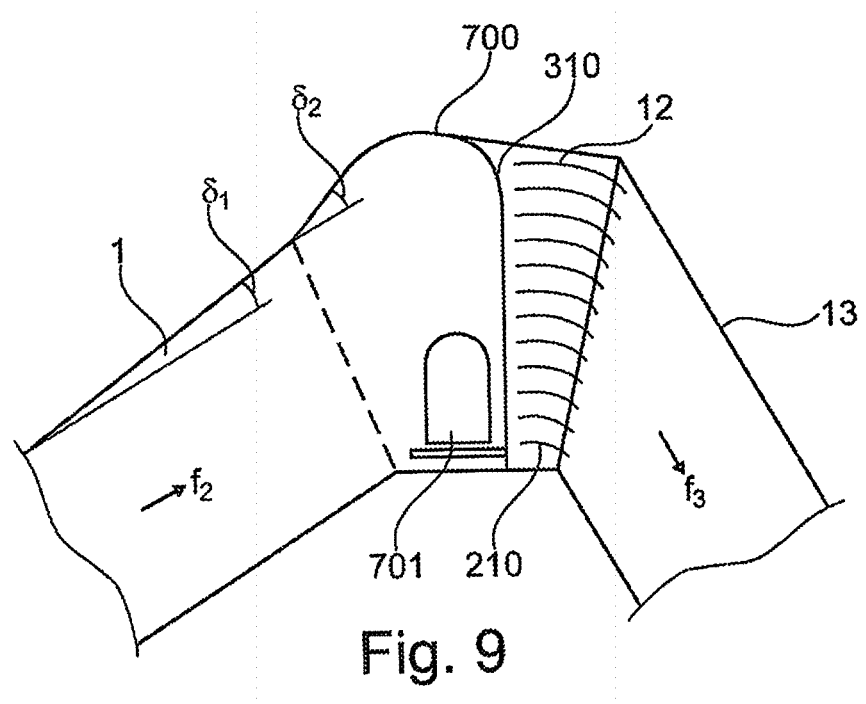

FIG. 9 is a side view of the down-stream parts of the inclined flight section, the down-stream access zone and facility and the return-flow section, in a vane-and-duct configuration, depicted for the case of a horizontal main tunnel-system.

Figure 10:
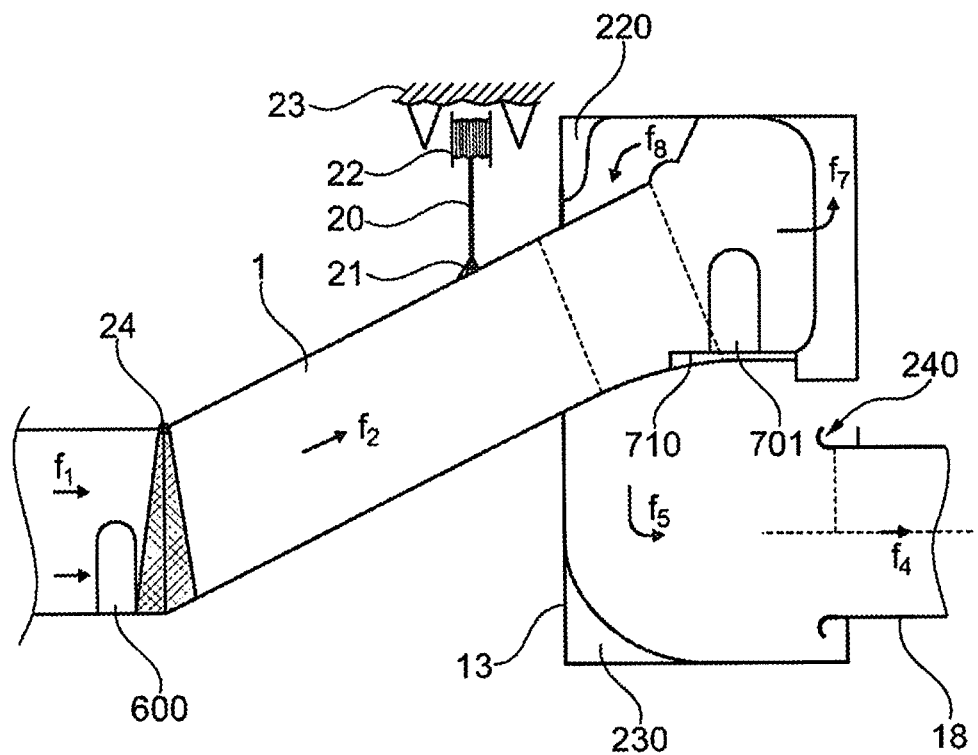

FIG. 10 is a side view of a complete inclined wind tunnel assembly using a rectangular swirl-flow return duct configuration, depicted for the case of a horizontal main tunnel-system.

Figure 11:
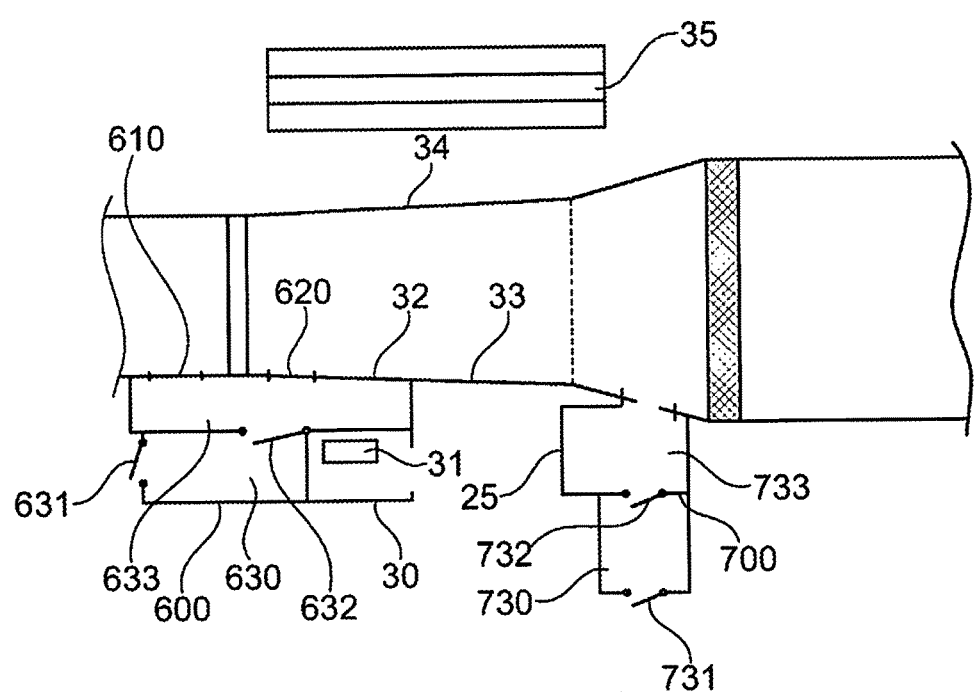

FIG. 11 is a top view of an inclined wind tunnel assembly showing placement and configuration of dual two-stage access systems, control room, transparent wall components, and spectator/video recording area.

Figure 12:
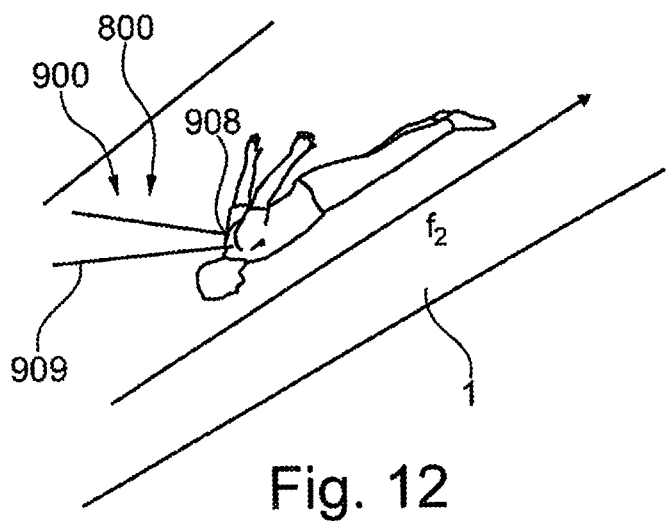

FIG. 12 shows a side view of a two-point suspension system version for use with the wind tunnel according to the invention.

Figure 13:
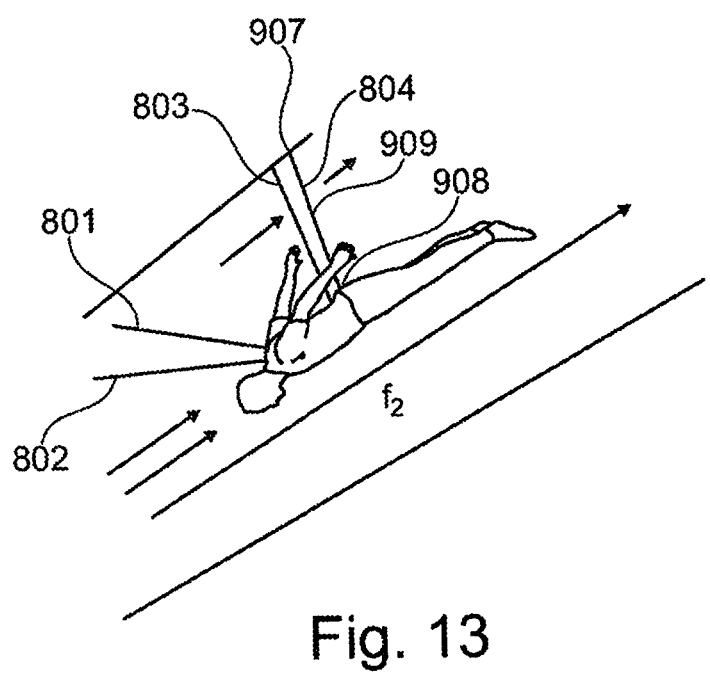

FIG. 13 shows the same conditions as in FIG. 12, but with the Flyer secured by a 4-point suspension system.

Figure 14:
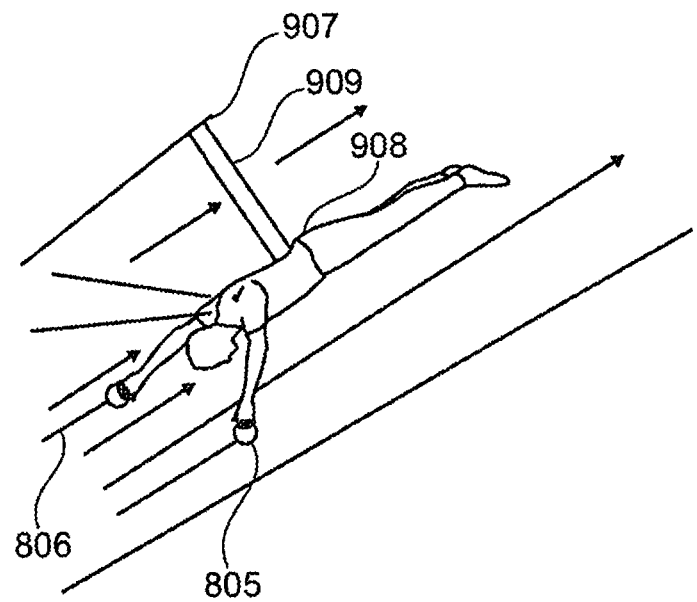

FIG. 14 shows the same conditions as in FIG. 13 with the Flyer secured by a 4-point connection system, with the addition of hand-held straps as well, here shown with soft rubber rings at their holding end.

Figure 15:
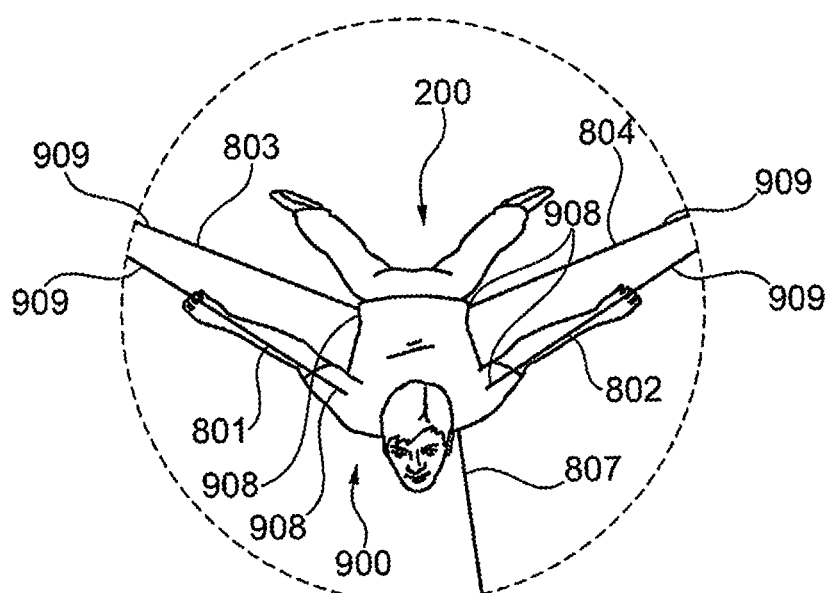

FIG. 15 shows the front view of the same conditions as in FIG. 13, with the Flyer secured by a 5-point suspension system.

Figure 16A:
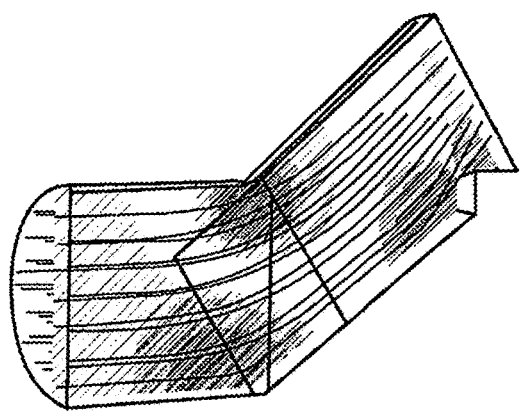
Figure 16B:
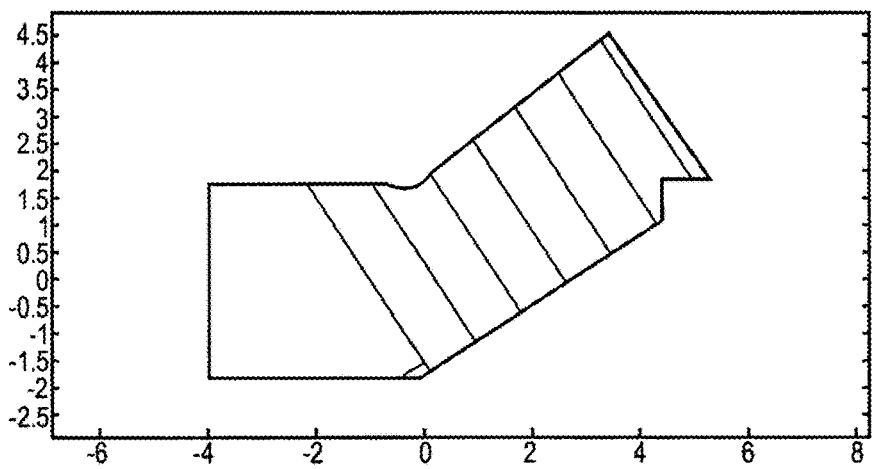
Figure 16C:
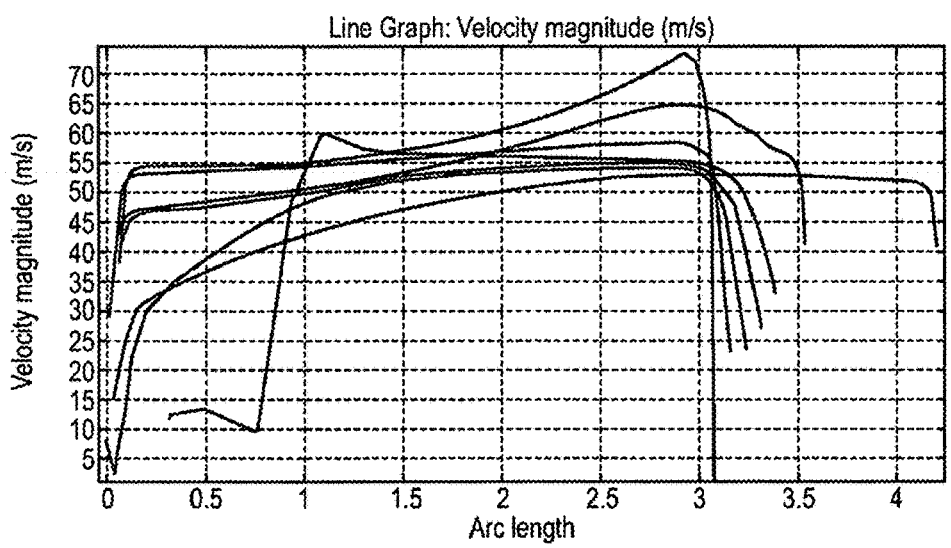

FIG. 16*a-c* show the air flow in the inclined section of the wind tunnel.

Figure 17:
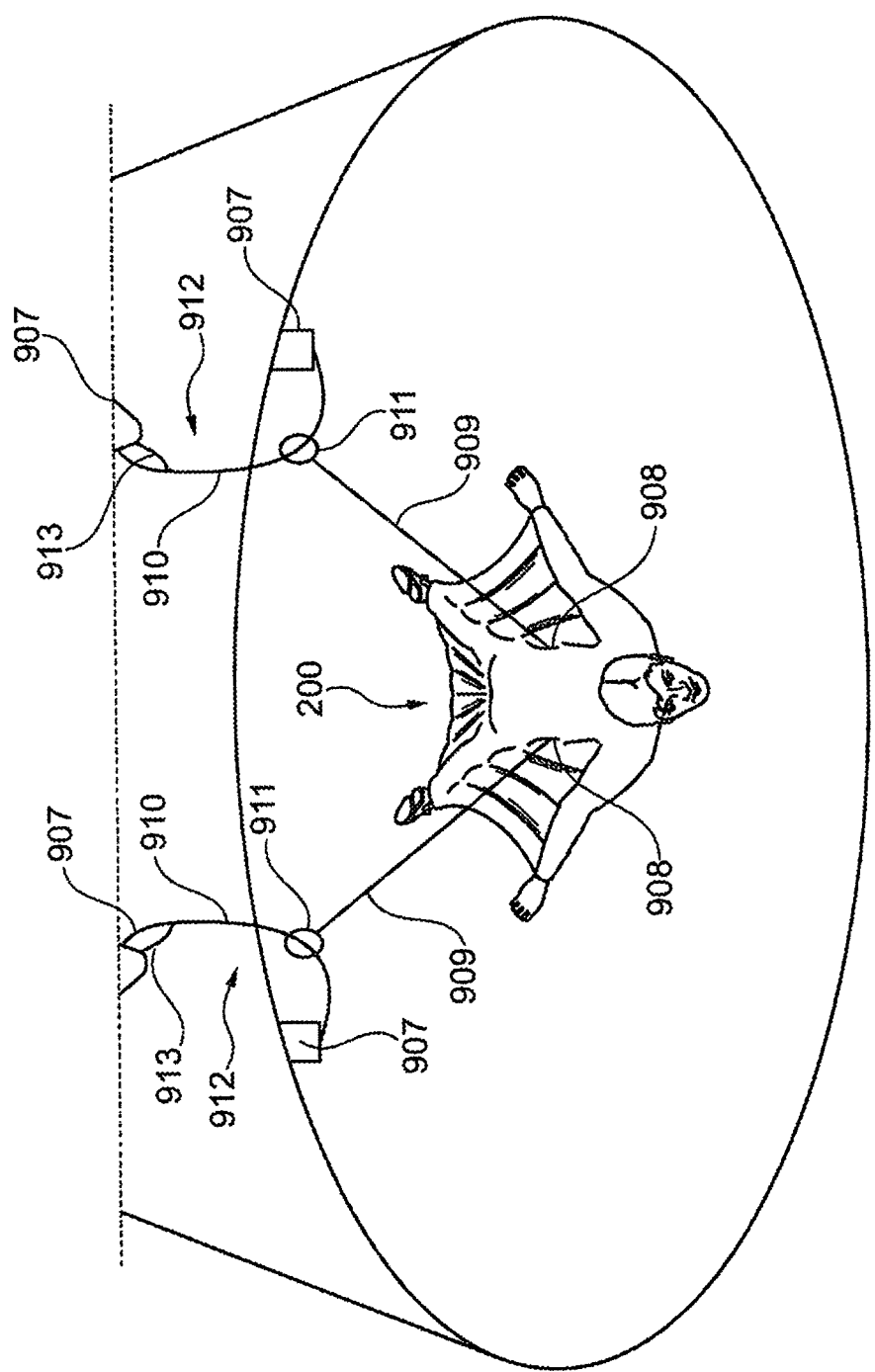

FIG. 17 discloses additional features of the suspension system as part of a safety system.

FIG. 18*a-c* discloses a planar view of a safety system for the inclined wind tunnel where the shape, size and orientation of the tunnel serve to minimize the risk of injury to a person using the wind tunnel.

DETAILED DESCRIPTION

Figure 1:
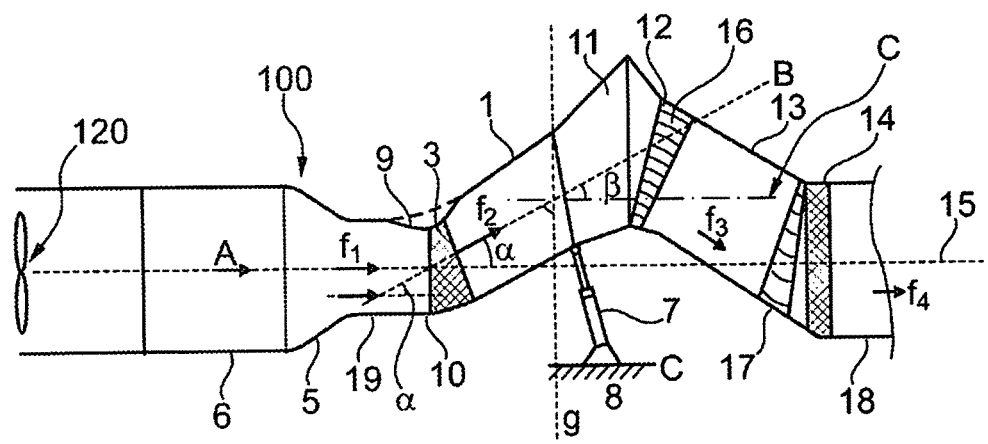

The horizontal plane referred to herein is defined as a plane that is perpendicular to the direction of gravitational acceleration, and is denoted by C in FIG. 1.

The term "stable sustained human flight", as used herein, refers to a flight for a human that can be performed for an unlimited time and be sustained in the air for as long as desired. The launch and landing may be performed in the same place or in different parts of the test section, and the landing may take place both upstream and downstream of the launch. Thanks to the combination of the inclined test section, the wind speed and the shape and properties of the flow field that serve to allow the human or flyer to remain airborne, the flight itself can be made to last for as long as desired and the flyer can move along the length and width of the test section and still experience suitable aerodynamic conditions for sustained flight. In contrast, some wind tunnels have a fixed launch area and landing area, each in different parts of the tunnel, and the flight from one to the other is strictly limited in time.

Referring now to FIG. 1, an implementation of an inclined wind tunnel for gliding flight is shown according to a preferred embodiment of the present invention. This preferred embodiment discloses a wind tunnel with a horizontal flow plan, but it is to be noted that other types of wind tunnel may also be used with the invention, as will be described further below with reference to FIG. 2a-2b for instance.

In FIG. 1, the wind tunnel 100 has a first portion 6 with a first central axis A that extends essentially horizontally. The wind tunnel 100 also comprises a second portion 1 having a second central axis B, said second portion 1 being an inclined wind tunnel flight section also referred to as a test section or flight chamber (these terms are used interchangeably herein). The wind tunnel 100 also comprises at least one fan 120 for creating a flow of air in the tunnel 100. The air flow in each portion of the tunnel is essentially parallel with the central axes, so that an incoming flow f1 in the first portion 6 has the same flow direction as the direction of the first axis A and an inclined flow f2 in the test section 1 has a flow direction parallel to the second axis B. A first angle α is formed between the first and second axes A, B.

In the test section 1, the flow direction is thus diverted vertically at the first angle α from the incoming flow f1 to the inclined flow f2, Said first angle α is preferably between 5-85°, resulting in a vertically inclined flow f2 that is suitable for suspended gliding flight of humans and larger objects/bodies. The second axis B is also at a second angle β to the horizontal plane C that is in turn perpendicular to the direction of gravitational acceleration g. Said second angle β is 5-85°, more preferably 15-60° to be suitable for suspended gliding flight.

In this and other embodiments where the first portion 6 is essentially horizontal, the first angle α is equal to the second angle β.

The change of the flow direction is achieved by means of a connecting portion 3, joining the first portion 6 after a contraction 5 in said first portion 6 and the inclined flight section tunnel 1. The connecting portion 3 can also be placed prior to the contraction 5, giving benefits in less aerodynamic drag. The connecting portion 3 is designed with flexible elements allowing the first angle α to be adjusted by means of an actuator 7, in this case depicted as a hydraulic cylinder attached to the inclined flight section 1 and a base of the premises 8, i.e. a floor of the building where the wind tunnel 100 is situated. The actuator could also be mechanical and could also be attached to an attachment point above or elsewhere placed.

The connecting portion 3 is designed so that the interior remains smooth with respect to the tunnel walls, such that the flow in the tunnel remains undisturbed, even as the first angle α is altered, and uses a flow-sealing flexible exterior shell such that airflow to the surrounding space is very low in the connecting portion, thus reducing disturbances to the flow in the tunnel. The connecting portion 3 may also be made in one layer with a smooth inside and a flow-sealing outer surface.

In the depicted embodiment of FIG. 1, the flow diversion is achieved by geometrical means using a combination of flow enhancing segments 9, 10, in more detail depicted in FIG. 3 4, 5, along an entry to the connecting portion and a geometrical shape of the connecting portion itself, resulting in a smooth transition from the horizontal tunnel 6 to the inclined flight section 1. The flow enhancing segments 9, 10 are designed so that the flow diversion is achieved specifically with undetached flow along the walls and to achieve a suitable flow distribution in the inclined flight section, avoiding flow wakes, turbulent eddies, wall detachments, low-velocity zones or other flow disturbances that would make the flow in the inclined section poor for sustained gliding flight exercises. The geometrical tunnel-wall continuity throughout the connecting portion is designed so that the wall-curvature is continuous, with a continuous direction-derivative, so that the flow remains attached to the walls through the connecting portion, avoiding flow disturbances. In addition, the tunnel walls of the connecting portion may also be equipped with small vents, allowing air to pass through the wall from the surroundings and into the connecting portion and inclined duct in certain locations, resulting in reduced wall detachment and vortices formation in the following inclined duct. The diversion enhancing segments 9, 10 are designed so that their shape changes with the first angle α using actuation such that the flow diversion remains optimal in the entire span of inclination angles operated. The connecting portion 3 is also extendible to allow for a change of shape to accommodate the alteration of the first angle.

In the depicted embodiment of FIG. 1, the inclined flight section 1 uses a constant area section, resulting in constant flow velocity condition in the inclined flight section. Following the inclined flight section is a safety section 11, wherein flow velocity is reduced to a fraction of the flow velocity in the inclined flight section. This reduced flow velocity allows for safer conditions for the human or object exercising sustained gliding flight in that the reduced velocity will result in "non-flying" conditions and the flying subject will be able to safely return to a controlled ground stationary state in a controlled way.

In the depicted embodiment of FIG. 1, the inclined flight section 1 continuing to the safety section 11 is followed by a second connecting portion 12, a return flow section 13 and a final interconnecting section 14. This combination of sections 12, 13, 14 may generally be referred to as a conduit arranged to connect a downstream end of the second portion to an upstream end of the first portion. The conduit is designed such that the flows are diverted in a direction towards the main flow plane 15 and then reverted to flow in-line with this, such that the flow direction changes from that in the flight section f2, to a return direction f3 and finally to the return flow direction f4. Both the second connecting portion and the first interconnecting section 14 uses flexible elements, and flow-optimal curved wall designs, similar to the connecting portion 3 as previously described. In these sections, flow guiding angle-adjustable turning vanes 16, 17 may be used to minimize flow frictional pressure losses in the re-diversion of the flow back to the main tunnel return duct 18, that also forms part of the conduit. In addition, the entire conduit, including return flow duct, may also be arranged to change angle according to the angle of the test section (1) resulting in a compact design of the entire wind tunnel system while maintaining high efficiency of the entire tunnel system producing low pressure losses.

In the depicted embodiment of FIG. 1 the return flow section 13 is extendible using sliding and flexible wall sections to encompass the geometrical changes occurring when the first angle α is altered. The extendible duct walls are designed such that there is minimal drag forces induced, in order to reduce pressure losses in the tunnel and thus reducing the need for energy to propel the system.

Figure 2A:
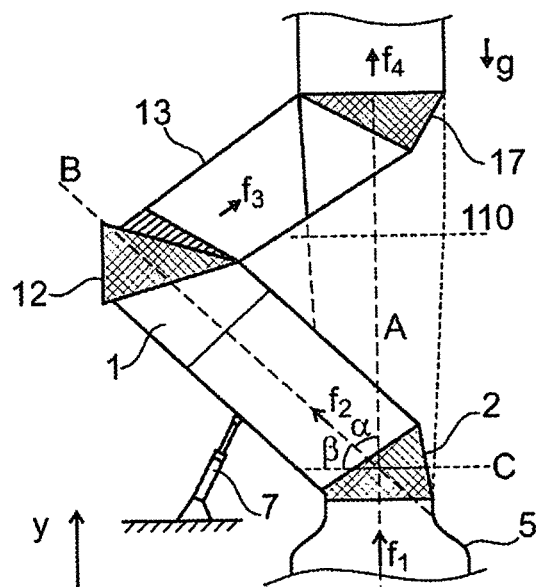

FIG. 2a depicts a design implementation similar to that of FIG. 1, but attached to a vertical wind tunnel system, such as a skydiving simulator, with a main flow plane 110 being perpendicular to the horizontal plane and parallel to the direction of the acceleration of gravity. The implementation includes all specific sections and items as that of the previously described embodiment, referred to in FIG. 1. In this embodiment, the incoming flow direction f1, being vertical, is diverted in a first connecting portion 3 to the first angle α and having an inclined flow direction f2 in the test section 1 and using a second connecting portion 12 directing the flow with a return direction f3 back towards the main flow plane, finally passing the first interconnecting section 14 where the return flow direction f4 is reverted to be aligned with to the main flow plane 110. Similar to the previously described embodiment, the sections employ specific designs to achieve a high quality and undisturbed flow in the gliding flight section, and low pressure losses in the overall design.

In embodiments where the first portion 6 is essentially vertical, the first angle α is equal to 90−β, so that the first angle α is 5-85°, preferably 30-75°.

Figure 2B:
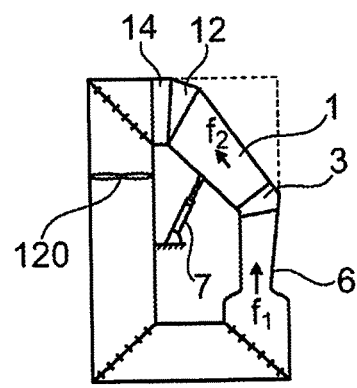

In another embodiment, depicted in FIG. 2b, related to implementation of the present apparatus in a vertical wind tunnel designed for skydiving simulation, the vertical flow in the first portion 6, is redirected in the connecting portion 3 into the gliding flight section 1 having an inclined flow direction f2 with an angle β in the range of 5-85° relative the horizontal plane, or preferable 15-60° as shown in FIG. 2a. The gliding flight section 1 is followed by a first interconnecting section 14 in which the flow is redirected to fit the return flow duct of the main tunnel system. The apparatus encompasses a variable inclinations angle by means of tilting the gliding flight section using a hydraulic or mechanical actuator 7 attached to the solid structure of the building. In order to encompass a flexible inclination angle, the second connecting portion and first interconnecting portion 12, 14 use flexible element designs similar to previously described embodiment and both the gliding flight section 1 and the return duct uses a telescopic functionality with sliding duct-walls to encompass the longitudinal extensions as inclination angle is altered.

FIG. 3 depicts a human person 200 executing stable sustained gliding flight in which the force of gravity on the human is balanced by the aerodynamic lift forces FL and aerodynamic drag forces FD. These forces are functions of several factors, for example inclination angle, flow velocity field 300, weight of the human, aerodynamic profile of the human, angle of attack between the human and the airflow γ, effective wing area and shape, wing loading (the ratio of total suspended weight to wing platform area of the wing), etc. A human Flyer may or may not wear garments that enhance her glide ratio (i.e. glide path angle relative to the horizontal plane) such as a wing suit. While in flight, a human sports Flyer is expected to deliberately make alterations in several of these aerodynamic variables by athletic technique, thereby moving around in-flight within the inclined tunnel section.

In the depicted embodiment of FIG. 3, the connecting portion 3 connecting the horizontal tunnel 6 to the inclined tunnel section 1 encompasses means for adjusting the angle of air flow or the flow field. In this embodiment, said means comprise flow diversion enhancing segments in both the ceiling 130 and floor 140. The flow diversion enhancing segments can be seen here as protrusions extending from the ceiling and floor, and these protrusions may be arranged in at least one wall portion (including ceiling and floor) and may also be of an adjustable shape so that an operator or operating system may alter the shape depending on a given situation.

The ceiling flow enhancing segment 130 ensures flow that remains attached to the ceiling of the inclined section 1, and hinders flow-detachment that would produce turbulent wakes in the ceiling of the inclined section being unfavorable to the exercise of sustained gliding flight in the inclined flight section. The floor flow-enhancing segment 140 is designed to alter the incoming planar flow field 400 to become a distributed flow field 300 in the inclined section, with higher flow velocity close to the inclined duct floor and lower close to the ceiling, designed to make gliding flight exercises self-stabilizing and safer by creating higher lift forces (due to higher flow velocity) as the human or object approaches the floor, thus lifting the person/object out into the central part of the tunnel, and lower close to the ceiling.

Other flow variations along a vertical gradient may be created, depending on both safety requirements and sporting requirements from human Flyers. Some of these sought variations may not be fully known today, from theoretical arguments only, but the present invention enables such variations along a vertical gradient to be created, to accommodate various requirements from different types of operations.

In another embodiment, the means for adjusting the angle of air flow or the flow field may also comprise turning vanes that can be stationary or movable and may move individually from each other.

In yet another embodiment, said means for adjusting the angle of air flow field may comprise the use of a single fixed or angle-adjustable turning vane attached to the ceiling of either of the test section (1) or any of the preceding segments, and positioned in direct connection to the ceiling flow enhancing segment 130. Such arrangements have proven to stabilize the flow field quality downstream in the test section and reduce all detachment of the flow in the ceiling of the test section, especially at inclination angles above 25 degrees.

Thus, the means for adjusting the angle of air flow or the flow field may comprise at least one turning vane 210 arranged in the ceiling of the connecting portion. This is advantageous in providing a homogenous flow field in the test section 1 and avoid the generation of eddies. In some embodiments, it may be advantageous to have a plurality of turning vanes, each being either fixed or with an adjustable angle.

Another aspect of this embodiment is that the inclined gliding flight section 1 is designed such that the tunnel duct cross sectional area increases along the flow direction in the gliding flight section, resulting in an exit flow profile 500 close to an exit section 150 with significantly lower magnitude (both maximum and average velocities) than the entry flow profile 400 in the inclined gliding flight section 1. The result of this change in the velocity magnitude downstream the long axis of the gliding flight section is that the human/object 200 is given another aspect of self stabilization. As the human/object 200 executes gliding flight and moves upstream down the inclined section, into a more narrow cross-sectional area with higher flow rate, the opposing drag force FD accordingly increases and pulls the human/object back towards the downstream proposed exit-section 150. Note that it may be desirable for some Flyers to both enter and exit the flight section in what is here called the exit section. At some point before reaching the exit section the drag force will be balanced with the parallel component of the gravity force and equilibrium is reached, generating a self-stabilizing effect. Such a long axis gradient of flow rate would have implications regarding both safety and sporting aspects. Exiting the tunnel is expected to be safer in a lower flow rate environment (therefore, the downstream door is called the exit), but it may also be desirable for some Flyers to enter the tunnel through the downstream door, whereas other Flyers may wish to enter through the upstream door. Beginners may wish to enter through the upstream door, with the entire tunnel operating at comparably low flow rates this would, through the increasing cross-sectional area, make the downstream part of the flight chamber have sub-flight flow rates, thus enabling non-flight and flight at the same time, the safety implication being that a beginner cannot be washed completely up to the end of the flight section. Thus, the tunnel 100 comprises at least one access door with air lock for allowing a person to enter or exit the tunnel 100 during operation. More preferably, the tunnel 100 may comprise at least two access doors, wherein said doors are arranged at either side of the test section (one upstream and one downstream).

An actuator 7, attached to the inclined gliding flight section 1 and to the solid building structure serves to alter the angle of the inclined section, in this embodiment limited to a range of 15-60° relative to the horizontal plane, which is the range of preferred gliding flight angle.

FIG. 4, depicts a specific aspect of an embodiment of the present invention. It shows the connecting portion 3, attaching the inclined gliding flight section 1 to the horizontal tunnel section 6, wherein it comprises separate flexible units 160, 170, 180, being interlinked with flexible flow sealing material on the outside of the section, joining the inclined section to the horizontal section in a flexible and flow-sealing way. Interior walls 190, 195 attached to the inclined section that can slide into the horizontal section 6 preceding the inclined section 1, provide smooth wall transitions reducing aerodynamic drag from the walls and preserving a wall-attached flow field resulting in a flow quality suitable for exercising gliding flight in the following tunnel section. If these aspects are not used the flow will experience wall detachment during the connecting portion and will cause eddies and wakes and other flow disturbances.

FIG. 5 depicts another specific aspect of an embodiment of the present invention. It shows the connecting portion 3, attaching the inclined gliding flight section 1 to the horizontal tunnel section 6, wherein guiding turning vanes 210 are used to divert the flow in a controlled way resulting in a flow field with superior properties such as even flow field in the entire tunnel cross-section for exercising sustained gliding flight in the following inclined section.

Figure 6:
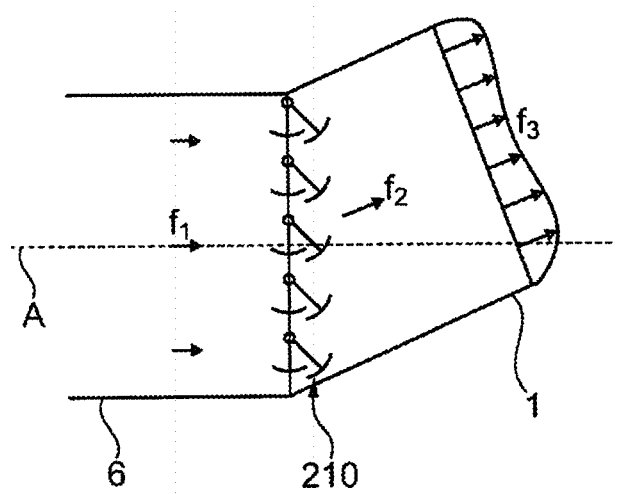
FIG. 6 is a detailed side-view of the flexible connecting portion connecting the inclined flight section to the main tunnel (horizontal in this picture) and specifically the implementation of adjustable flow-guiding "turning vanes".

FIG. 6 depicts an aspect of the embodiment wherein an array of adjustable flow-guiding vanes 210 are used to achieve the diversion of the flow from the main flow plane of a horizontal tunnel section 6 with a horizontal incoming flow direction f1 to an inclined flow direction f2 in the inclined gliding flight section 1. The array of guiding vanes 210 produces a controlled flow field in the inclined gliding flight section and also results in a lower pressure loss in the flow than would otherwise have been produced by the diversion of the flow. In one embodiment, the guiding vanes are constructed so that they can be individually adjusted, in a range of diversion angles from 20-70° relative to the incoming flow direction, resulting in the preferred inclination angle of 15-60° in relation to the horizontal plane, and dynamically controlled from a gliding flight control panel (not shown) for setting a desired flow field distribution across the width and along the length of the inclined gliding flight section, resulting in advantageous flow conditions for exercising various types of gliding flight, for example but not limited to partly self-stabilizing flight, with a higher flow rate close to the floor of the flight section, or more advanced and performance oriented flow conditions with high concentrated flow rates in the center of the flight section duct width.

Figure 7:
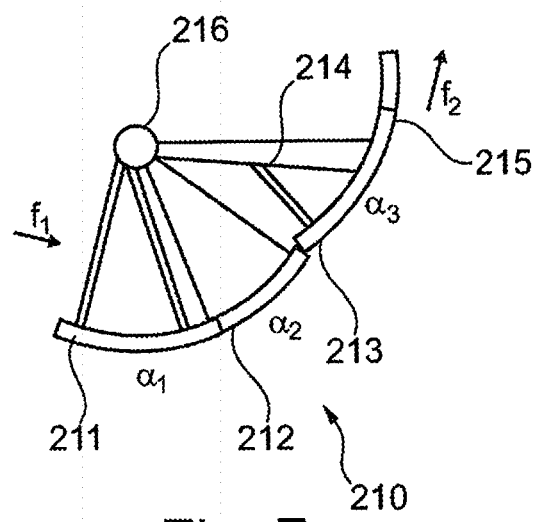
FIG. 7 is a side view of the principal construction of dynamically adjustable turning vanes of the present invention, being capable of directing the air-flow in a span of diversion angles.

FIG. 7 depicts details of the technical design of the adjustable guide vanes 210, in full extension to give maximum angular flow diversion, used in the embodiment described in FIG. 6, wherein each adjustable vane assembly comprises several extendable vane-sections 211, 212, 213, each having a certain diversion angle $\alpha 1$, $\alpha 2$, $\alpha 3$ typically 20°, and the one at the downstream end where the outgoing flow direction f2 is completed, comprises an additional extension with a flat panel 215 guiding the flow straight out from the vane exit resulting in a well-directed flow, a low pressure loss, and minimal flow turbulence. Each vane-section is attached with structural bars 214, holding each vane-section in the right position, to the center axle 216 to which all vane-sections are attached. This center axle 216 comprises a static axle to which the leading edge vane-section 211 is attached, that is fixed, and concentric rotatable joints to which the following two vane-sections 212, 213 are attached. These rotatable joints are controlled by actuators attached to the sides of the complete vane assembly, for individual dynamic control.

Figure 8B:
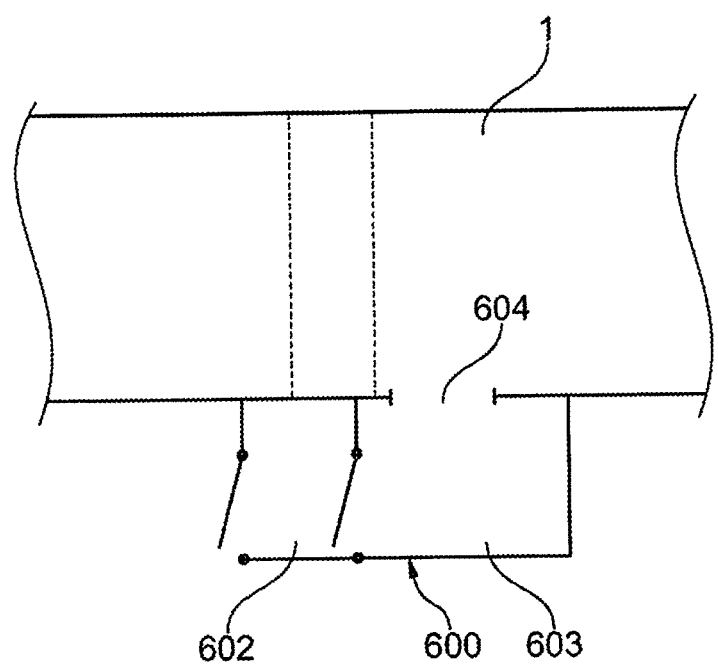

Referring to FIGS. 8a and 8b, another embodiment of the invention is described, wherein a two-stage access system 600 is described, situated in the upstream end of the inclined gliding flight section 1. An access compartment 601 is used for entry and exit of human persons or objects into the inclined flight section. The two-stage system, having two separated pressure-sealed compartments, the first 602 functioning as antechamber, and the second one as pre-flight room 603, wherein several human persons and/or objects can stay while waiting for and preparing for gliding flight exercise. From the pre-flight room 603 the flight section is easily accessed through an open access-gate 604 without covering door-material. The use of the described two-stage access system benefits from allowing for entry or exit into the flight section without reducing flow rate in the flight tunnel and thereby creates an air lock system. This allows for a much more efficient operation of the tunnel and for several persons or objects to enter and exit in any chosen order, into the flight section. If a single stage system would be used, the pressure difference of the exterior room and the interior of the flight section would result in an immediate and significant flow into the flight section, because it is at lower pressure than the surrounding, resulting in a strong disturbance of the flow in the flight section. Such a large disturbance would mean a safety risk and risk for uncontrollable aerodynamic forces on any object or person in the flight section, with risk of personal injury or object damage due to crashing into the tunnel walls. These risks are mitigated by the two-stage system, in which only one door at a time is opened, meaning that no in- or outflow can occur during entry or exit. Another important benefit of the two-stage access system is that safety-instructors and/or machine operators can be situated in the innermost compartment with immediate access to the flight section and the persons or objects inside, allowing for a safer operation of the wind tunnel as a whole. If a personal injury of any severity would occur, the herein described setup with dual access located upstream and downstream will facilitate extraction of the injured person. If a personal injury motivates an emergency immediate full stop of the airflow by fan shutdown, the injured person will probably slide down towards the upstream door by the force of gravity—having an access zone at this point is therefore seen as a basic safety requirement, even if the downstream door may be used as the preferred access during normal operations due to its lower flow rate.

If be first portion 6 is essentially vertical, the placement of the upstream door 600 is especially important.

Referring to FIG. 9, another embodiment of the present invention is described, showing the downstream section of the inclined gliding flight section 1, in connection to a downstream access zone 700 with a downstream access door 701, the second connecting portion 12 with an array of adjustable angle flow-guiding vanes 210, and the return section 13. It is depicted how the inclined flight section is designed with an expanding cross section, achieving a larger cross sectional area downstream thus resulting in lower flow a along the length of the inclined flight section. The expansion encompasses a wall expansion angle (δ1) in the range of 2-8° relative to the tunnel center-line, in order to achieve a significant flow rate reduction while maintaining wall-attached flow conditions and minimizing the risk of unsteady flow condition or turbulence. In the entry of the downstream entrance/exit section 700 a larger wall expansion angle β2, in the range of 5-20° relative to the tunnel center-line, is used to achieve a larger reduction of flow rate to ensure safe conditions in the downstream access zone, and safe and easy entry and exit of persons and/or objects through the downstream access door. In connection to the access door an access ramp is placed, made by a durable and aerodynamically suited material, typically a metal net or stretched steel mesh allowing a stable structure and smooth airflow through it, constructed as a platform going into the downstream access zone, enabling persons to enter, stand static or exit in a comfortable and safe way. The ramp including mesh will be constructed in a shape and manner that minimizes energy/flow losses due to its drag. Just downstream of the access ramp a safety-net 310 is situated, hindering objects and persons to by accident hitting the following flow-guiding vanes, as an important measure of safety. If not present, unwanted and dangerous damage to persona and objects or the vanes themselves could occur. The purpose of the flow-guiding vanes is to divert the flow direction from that in the inclined flight section f2 to a flow direction in the return duct f3 towards the main flow plane.

FIG. 10 depicts an aspect of the embodiment wherein the return flow section 13 connecting the inclined flight section 1 to the main return duct 18 is constructed in a way using a swirling free-flow design, using an unguided low-velocity transversal flow design. The swirling return duct is box shaped and is designed with enclosing walls in a rectangular shape such that the inclined sections flow f2 is split in half and diverted into sideways flow f7 by the front wall diversion baffle. The flow then starts a swirling motion and turns 180° passing backwards along and outside the inclined tunnel sections sides until the flow is influenced by a back-wall baffle 220 pushing the flow direction downwards f8. The flow continues in a downward directed swirl flow f5, is pushed forward (i.e. in the general direction of the main return flow direction) again by the influence of a bottom-baffle 230 and finally recombines into the main return flow direction f4. The design of the return duct system with the diversion baffles results in a simple yet comparably efficient construction with minimal pressure losses making the return duct simple to build and robust while ensuring relatively low pressure losses enabling an energy efficient tunnel operation. Another aspect of the embodiment, also depicted in FIG. 10, is the use of a trumpet-shaped bellmouth entry nozzle 240 resulting in a significant reduction of pressure losses and improved energy efficiency, but also reduced noise and heat generation as well as a stabilization of the flow dynamics.

Another embodiment depicted in FIG. 10 is the placement of the upstream access system 600, before (upstream) the first diversion duct 24 resulting in safer and more flow-stable access into and out of the tunnel during its operation.

Another embodiment depicted in FIG. 10 is the use of a downstream access door 701 with an aerodynamically optimized ramp 710, as previously described designed for optimal accessibility to the tunnel and safety for the users without imparting the flow.

Another embodiment depicted in FIG. 10 is the construction of the mechanism for actuation of the inclination angle, in this case consisting of a wire-system 20 attached in one end to the inclined tunnel section close to its upper side 21 and the other end attached via an electro-mechanically actuated winch apparatus 22 in turn attached to a solid part of the building structure 23, the winch being capable of pulling in the wire and thus lifting the entire inclined tunnel section. In order to achieve a controlled inclination motion when engaging the wire system, or any other actuation system, the inclined tunnel section is hinged in the top connecting point of the connecting portion 24. The construction also encompasses slidable and flexible sections in the return duct wall, capable of encompassing the translational motion of the inclined tunnel section as inclination angle is altered, while maintaining a proper flow sealing of the return duct.

Another embodiment depicted in both FIGS. 1 and 10, relates to the overall height dimension of the present invention. By using an inclined flight section as described in FIGS. 1, 10 and others, the present invention results in a total height dimension of less than 10 m for a flight section length of 10 m, due to the use of inclined flight section. This reduction in the need of building height compared to any preceding vertical wind tunnel design and construction is significant in that it allows for the apparatus described in the present invention to be implemented in sites and buildings with less problematic aspects of building permits from authorities, reducing total building cost, and ease of introducing such apparatus in a commercial building in general.

FIG. 11 depicts an aspect of the embodiment encompassing dual two-stage access systems, one for the upstream access zone 600 and one for the downstream access zone 700, attached to the inclined flight section 1. This use of dual access systems enables access to both zones continuously and simultaneously, during operation of the wind tunnel and at any flow rate, while maintaining a steady and undisturbed flow in the flight section necessary for exercise of sustained gliding flight in a safe and controlled way. If any of the two access zones would be operated without use of said two-stage access systems, a significant in- or outflow through the access door would occur, greatly influencing flow conditions as well as the ease and safety of access procedures. In the depicted design, the upstream access zone is equipped with dual access doors, one before 610 the connecting portion and one after 620, enabling improved use of the inclined tunnel in such a way that a beginner user or a prototype object may be entering the tunnel in the downstream access point 620 while an instructor or experimental leader may enter through the upstream access point 610, greatly simplifying operation and making beginner instructions simpler and more safe. Both two-stage access systems depicted encompasses an antechamber 630, 730 sealed from the surrounding atmosphere (to hinder in- or outrush flow) with an exterior door 631, 731, inner doors 632, 732 also hindering in- and outrush flows, and pre-flight chambers 633, 733 where persons and objects can be waiting prior to entering the flight section of the tunnel.

Another embodiment depicted in FIG. 10 is a control room 30 for the tunnel machine operator, situated in the vicinity of the inclined tunnel, the upstream access zone and pre-flight waiting room. The separating walls of the control room are made from transparent material, such as glass or transparent plastics. The inclined flight section walls facing the control room, both upstream faces 32 and downstream faces 33, as well as a side window 25 of the downstream pre-flight room are also made from similar transparent materials, thus giving full visibility from the control room to all areas of the inclined flight section as well as the pre-flight rooms 633, 733 of both access systems. The operator situated in the control room is in direct control of the wind tunnel fan system, regulating the flow rate in the inclined flight section by controlling manually the fan speed, ensuring that appropriate flow rate is achieved for the gliding flight exercise and also ensuring quick stop of the flow if needed.

In another embodiment, the operator in the control room is also in control of the inclination angle of the flight section, and can dynamically adjust this angle to fit the exercise and ensure a proper gliding flight exercise by giving the right flow velocity and gliding flight angle.

In yet another embodiment of the present invention, the wind tunnel fan motor and inclination angle control can be remotely (wirelessly or by wire) controlled from a control device operated by an instructor from inside the pre-flight chambers or from inside the actual flight section of the tunnel, thus limiting the need of an operator and making operation safer and reducing operational cost. If at any point the connection to the remote-control is detected to be lost the wind tunnel fan motor controller will make a full stop and go to zero flow rate.

In yet another embodiment of the present invention, the remote-control operated by the in-flight instructor in the flight section may be designed as a "dead-man's-grip", so that if the instructor loses the control of it, for instance physically loses it or becomes incapacitated, or if the remote control and the main computer loses connection, the fan system will make an immediate full stop.

In yet another embodiment of the present invention, limited or full emote-control may be given to another Flyer than an instructor, e.g. giving a Flyer control over the angle within certain limits, but not control over the fan or other safety-critical aspects of operations.

In yet another embodiment, depicted in FIG. 11, the side of the inclined flight section opposite of the access systems and control room 34 is constructed from transparent material (for example glass or transparent plastics), so as to give full visibility of the gliding flight exercise to a spectator or video-recording area 35. This allows spectators and videographers to view and record gliding flight exercises including televised competitions at close distance.

Referring to FIGS. 16 *a, b* and *c*, simulation results of 3-dimensional flow field achieved using an embodiment of the present invention is shown in FIG. 16*a* simulated at an airflow diversion angle of 35 degree and at flow rate 50 m/s, using the previously described embodiment with connecting portion using flow enhancing wall sections and without flow-guiding vanes. The simulation shows that the invention results in a high quality flow field, having only minor velocity deviations across the with and no wakes or detachment zones, as a result of the use of the special geometric flow enhancing wall sections in and prior to the connecting portion. FIG. 16*b* depicts 2D cross section lines onto which the flow rate distribution is plotted in FIG. 16*c*. FIG. 16*c* depicts representations of the flow-field distribution in certain cross-sections in the inclined section of the tunnel.

To provide safety for a person or flyer using the wind tunnel, a safety system is provided. The safety system comprises a delimiting arrangement 900 that is provided at the test section 1 and serves to provide safety by preventing the flyer from leaving the test section 1. The delimiting arrangement 900 comprises a suspension system 800 as described further below, but also properties of the wind tunnel itself that serves to prevent the flyer from reaching too far upstream or downstream and thereby prevent injuries.

For an inexperienced flyer, the suspension system 800 is generally required to facilitate learning to use the wind tunnel and to prevent collisions with the walls and floor, but for a more experienced flyer the delimiting arrangement in the tunnel itself may be enough to provide safety during use.

The wind tunnel 100 according to the present invention may thus be equipped with a suspension system 800 for use by a person flying in the test section 1. The suspension system may be mounted on an inner wall of the test section 1 and the system preferably comprises at least two tunnel attachment points 801, 802; 907 to said wall, as will be described in more detail below. More preferably, the suspension system comprises at least one but preferably two shoulder attachments and at least one but preferably two hip attachments for the person, each of said attachments 801, 802, 803, 804 being arranged to be individually disengaged by the person.

Thus, the person using the wind tunnel, hereinafter called the Flyer, will be secured in several axes of movement. Albeit thus restrained, the Flyer will be able to move sufficiently to learn to feel the airstreams around her body. The straps towards the tunnel wall can be tightened or loosened according to the wishes of the Flyer and her Instructor.

Under these restrained conditions, permitting only a limited amount of movements in the center of the tunnel, the Flyer will learn the basics of human flight. Depending on the learning curve and other considerations, the Flyer may spend a longer or a shorter time in this introductory setup. This beginner safety system may be used with or without glide-ratio enhancing garments such as various types of wing suits or tracking pants. It may also be used with skis for training ski-jumping, or with other means for human gliding flight. While training ski-jumping, it may not be necessary to disconnect at all, making the use of a quick release system superfluous. Depending on the wishes of the Flyer and the type of flying desired, the connection point between the strap(s) and the harness may be moved aft on the Flyer. A connection point on the chest but may be desired for some Flyers connected by a singular strap to the tunnel floor.

Referring to FIG. 12, an implementation of means for progressive education and takeoff to achieve sustained and controlled human gliding flight in an inclined wind tunnel is shown in the case of a Flyer connected to the tunnel walls on the sides of her, rising laterally. These straps are connected to the full body harness of the Flyer, with or without a quick release system.

When the Flyer has demonstrated control and necessary skills, the attachment system is released, and the Flyer is flying unfettered. This beginner safety system may be used with or without glide-ratio enhancing garments such as various types of wing suits or tracking pants.

It is also demonstrated by FIG. 12 that a two-point connections system at the shoulders is expected to be self-stabilizing, with the Flyer in flight yet still connected to the tunnel wall since the airflow will be washing down the body of the Flyer, cranio-caudally towards the legs and feet of the Flyer. The connection is above the center of gravity of the Flyer, which is important for stability.

Referring to FIGS. 13 and 15, it is shown that a 4-point connection system with connection points at the shoulders and hips, bilaterally, is expected to secure a beginner Flyer in a very stable and restrained setup, considerably reducing any risk of bumping into the tunnel walls. Further stability may be achieved if also the legs are connected in a suspension system.

Referring to FIG. 14, it is shown that the addition of hand-held straps as well, here shown with soft rings at their holding end, may add further stability and safety to some Flyers. Such hand-held straps can be floating freely in the airstream, only connected to the tunnel walls, and when the Flyer releases them, they will by the force of air move towards the tunnel walls and adhere to the wall surface, leaving the tunnel free for flight. Hand-held straps must be soft at their ends where the Flyer holds them, so that there is no risk for them hurting the Flyer upon release.

FIG. 15 further discloses a fifth attachment 807 that may be used to connect the Flyer to a floor of the test section 1. It is to be noted that the suspension system may be varied depending on the needs and wishes of an individual Flyer.

The delimiting arrangement 900 will now be described again with reference to the FIGS. 12-15 and also to FIG. 17 and FIG. 18.

As previously mentioned, the suspension system 800 comprises at least one tunnel attachment point 907 at an inner circumference of a tunnel wall of the inclined test section (1). The tunnel attachment points 907 comprise a holder for securing a strap 909, said holder preferably being arranged in an indentation or flush with the inner circumference of the tunnel wall. This serves to prevent the flyer from injury if be or she should come into contact with the tunnel wall. The tunnel attachment point 907 may also be anchored on a point outside the tunnel so that only the holder extends into the tunnel itself, and the holder is preferably soft and durable such as a band or ribbon onto which the strap 909 is fastened. The strap 909 is then secured to a person attachment point 908 on a harness worn by the flyer, to hold the flyer securely in a desired portion of the test section 1 and prevent injury.

Preferably, at least two tunnel attachment points 907 in a top half of the inner circumference of the tunnel wall are used, and each is coupled via a strap 909 to at least two person attachment points arranged on a hip portion of the harness, one on a left hand side and one on a right hand side of the harness. Thus, a first strap is configured to be attached to one of the tunnel attachment points and to the person attachment point on the left hand side of the harness, and a second strap is configured to be attached to one of the tunnel attachment points and to the person attachment point on the right hand side of the harness. This allows for a stable and secure mounting of the flyer in the tunnel. In order to accommodate differences in height and weight, the harness may be provided with multiple person attachment points 908 so that a selection can be made for the fastening of the strap 909 on each individual flyer. In one embodiment, adjustable person attachments points on the harness are used, that can be adjusted to a desired position on the individual flyer, instead of disconnecting her and choosing another fixed attachment point.

The strap 909 itself can preferably be extended upon application of an extension force, wherein said strap comprises a yielding device that is arranged to extend the strap and/or wherein the strap is elastic, so that the strap can be extended a limited length. This allows for a softer contact between the flyer and the suspension system 800 and prevents sudden jerks and stops that would be unpleasant and potentially harmful, as well as enabling an attachment of the flyer to the suspension system 800 by fastening the strap 909 to the person attachment point 908 when the person wearing the harness is outside of the inclined test section of the tunnel. For instance, the flyer may put on the harness and connect herself to the suspension system 800 by fastening the elastic or extended strap 909 to the harness before entering the test section 1. This is convenient and time efficient, while also allowing additional security in cases where the flyer enters or exits the test section 1 while the fan is active.

Preferably, the limited length that the strap 909 can be extended is in the range of 10%-500% of a length of the strap 909, and/or said extension force needed to perform the extension is in the range of 20-1000N. This allows for suitable and convenient extension through the yielding device or the elasticity of the strap. The yielding device may comprise a system using a spring loaded roll with a locking mechanism, similar to those used for seat belts in vehicles, where the belt may be extended when subjected to a smaller force but may prevent the extension upon exposure to a larger force. For the suspension system according to the present invention, this would allow for a flexible use where the flyer can move around freely, but still be prevented from injury due to a sudden fall or uncontrolled sideways movement or similar.

The strap 909 may in an alternative embodiment disclosed by FIG. 17 be configured to be attached to the tunnel attachment point 907 via a slidable connection 911 to at least one slide track device 912 comprising at least one rope, wire or rail 910 that is connected to at least two of the tunnel attachment points 907 so that the slidable connection 911 is able to slide along the slide track device 912. The slide track device 912 can be simply a rope or wire that runs along a roof in the test section 1 between one tunnel attachment point 907 located upstream and another located downstream. By mounting the strap 909 on the slidable connection 911 that for instance can be a spring hook, carbine hook or simply a loop of the strap 909, the person wearing the harness will be able to move in a lengthwise direction, i.e. upstream or downstream, while having limited movement from side to side.

In order to hold the slide track device 912 firmly towards the tunnel wall, the rope or wire is connected to the tunnel attachment point via an elastic connection 913 that urges the rope or wire towards the tunnel attachment point. This creates the important effect of minimizing any risk for the flyer becoming entangled with the slide track device 912.

In another embodiment, the suspension system 800 of the delimiting arrangement 900 comprises at least two harnesses and a plurality of tunnel attachment points 907 and straps 909 to enable attachment of the harnesses to the tunnel attachment points 907 via the straps. This enables safe flying conditions for two or more flyers simultaneously. By distributing the tunnel attachment points 907 along the tunnel wall circumference and along a length of the test section 1, and by selecting the length and elasticity of each strap 909, each flyer and their harness may have a volume of movement within the test section 1 that is prevented from overlapping with a volume of movement of another flyer. This prevents collisions between the flyers and also prevents their straps 909 from becoming entangled.

Apart from the suspension system 800, the delimiting arrangement 900 also comprises features and structures of the wind tunnel 100 itself that serves to increase safety and prevent injury. Thus, the delimiting system may comprise a contracted tunnel portion 901 having a cross-sectional surface area of less than 90% of a cross-sectional surface area of the test section 1 and may also comprise an expanded tunnel portion 902 having a cross-sectional surface area that is at least 20% larger than a cross-sectional surface area of the test section.

The expanded tunnel portion 902 has a lower air speed, due to the increased volume, while the contracted tunnel portion 901 has a higher air speed due to the decreased volume. This results in one portion (the expanded portion 902) where the flyer is forced to land because the air flow field is not strong enough to enable flying, and another portion (the contracted portion 901) where the air flow field is too strong so that the flyer is prevented from entering that portion. Preferably, both the expanded tunnel portion 902 and the contracted tunnel portion 901 are placed upstream from the test section, with the expanded tunnel portion 902 being furthest upstream. Thanks to this arrangement, the flyer will be prevented from moving further upstream than the expanded tunnel portion 902.

In one embodiment, an expanded tunnel portion 902 may also be provided downstream of the test section 1 to force the flyer to land if she should attempt to proceed downstream from the test section 1.

Another embodiment of the delimiting arrangement 900 comprises a reduced angle portion 903 where the air flow is redirected in such a way that flying is prevented in a certain section upstream and/or downstream of the test section 1. This portion therefore comprises air flow redirection means, preferably by placing the reduced angle portion 903 itself at an angle with respect to the test section 1 or by providing a flow guiding device such as a guiding vane, a bump or other means for redirecting a flow of air as described above with reference to embodiments of the inclined wind tunnel itself.

The air flow in the reduced angle portion 903 is preferably redirected an angle of at least 3°, preferably at least 5°, towards the horizontal plane compared to the air flow in the test section, and the reduced angle portion 903 is preferably arranged upstream of the test section to force the flyer to land in a manner similar to the expanded portion 902 described above.

In some embodiments, at least one safety net may also be provided as part of the delimiting arrangement 900. Preferably, the net 905 is provided downstream to catch the flyer if they should fly too far along the tunnel, and in some embodiments a first net 905 may be elastic in order to catch the flyer softly while a second net 906 that is rigid is provided to assure that nothing is allowed to proceed further downstream. In some embodiments, a net 905 that is preferably elastic may also be provided upstream. These different embodiments are disclosed by FIG. 18a-c.

In one embodiment, the tunnel portion upstream from the test section 1 (and optionally beyond the contracted/expanding/angled sections arranged there as part of the delimiting arrangement 900) is arranged vertically. In that embodiment, it is advantageous to arrange a further safety net 905 between the test section 1 and delimiting arrangement 900 on one hand, and the vertical tunnel portion on the other, i.e. across the opening to the vertical tunnel portion so that the safety net 905 serves as a floor.

It is also to be noted that what is said herein with reference to one embodiment may freely be combined with other embodiments unless it is expressly stated that such a combination would be unsuitable.

The invention claimed is:

1. A wind tunnel for stable sustained human flight, the wind tunnel comprising:
   a flight chamber having a central axis;
   a fan for creating an air flow in the flight chamber, the air flow being directed from an upstream end of the flight chamber towards a downstream end of the flight chamber; and
   a reduced angle tunnel portion coupled to the flight chamber such that the reduced angle tunnel portion is upstream or downstream of the flight chamber, a central axis of the reduced angle tunnel portion is at an angle with respect to the central axis of the flight chamber,
   wherein the central axis is at an angle of 15°-85° with respect to a horizontal plane,
   wherein the reduced angle tunnel portion is configured to redirect air flow in the reduced angle tunnel portion such that a direction of the air flow in the reduced angle tunnel portion is at least 3' closer to the horizontal plane than a direction of the air flow in the flight chamber.

2. The wind tunnel according to claim 1, wherein the angle is 15°-60°.

3. The wind tunnel according to claim 1, further comprising at least one of:
   an expanded tunnel portion that is upstream of the flight chamber, the expanded tunnel portion having a cross-sectional area that is at least 20% larger than a cross-sectional area of the flight chamber, or
   a contracted tunnel portion that is upstream of the flight chamber, the contracted tunnel portion having a cross-sectional area of less than 90% of the cross-sectional area of the flight chamber.

4. The wind tunnel according to claim 1, wherein
   the flight chamber is coupled to a vertical tunnel section at the upstream end of the flight chamber,
   the vertical tunnel section is aligned with a main flow plane, the main flow plane being perpendicular to the horizontal plane and parallel to a direction of acceleration of gravity, and
   the wind tunnel further includes a return flow section that is downstream of the flight chamber, the return flow section configured to direct the air flow from the downstream end of the flight chamber towards the main flow plane.

5. The wind tunnel according to claim 1, further comprising:
   at least one access door that is upstream of the flight chamber or downstream of the flight chamber.

6. The wind tunnel according to claim 1, further comprising:
   a two-stage access system that is upstream of the flight chamber or downstream of the flight chamber, the two-stage access system including
      an air-lock system including two separated pressure-sealed compartments, one pressure-sealed compartment is a pre-flight chamber including an open access-gate to the flight chamber, another pressure-sealed compartment is an antechamber.

7. The wind tunnel according to claim 1, wherein the flight chamber has an increasing cross-sectional area with increasing distance from the upstream end along at least a part of a length of the flight chamber.

8. The wind tunnel according to claim 1, wherein the angle is adjustable.

9. The wind tunnel according to claim 8, wherein the angle is adjustable by means of a hydraulic actuator or a mechanical actuator.

10. The wind tunnel according to claim 1, further comprising:
a means for adjusting a flow field of the air flow in the flight chamber in terms of flow-direction distribution and/or flow-rate distribution, such that the wind tunnel is configured to define a fixed or dynamically adjustable flow field of the air flow in the flight chamber during operation of the wind tunnel.

11. The wind tunnel according to claim 10, wherein the means includes turning vanes that are stationary or movable.

12. The wind tunnel according to claim 10, wherein the means includes flow diversion enhancing segments that include protrusions arranged in at least one wall portion of the wind tunnel.

13. The wind tunnel according to claim 1, further comprising:
a delimiting arrangement in the flight chamber, the delimiting arrangement configured to prevent a person using the flight chamber from unintentionally leaving the flight chamber, the delimiting arrangement including
at least one tunnel attachment point at an inner circumference of a tunnel wall of the flight chamber,
at least one person attachment point on a harness,
at least one strap configured to be attached to the at least one tunnel attachment point and the at least one person attachment point for securing the person wearing the harness to the flight chamber.

14. The wind tunnel according to claim 13, wherein the at least one strap is configured to be extended upon application of an extension force, wherein
the at least one strap includes a yielding device that is configured to extend the at least one strap, and/or
the at least one strap is elastic, so that the at least one strap is configured to be extended a limited length.

15. The wind tunnel according to claim 13, wherein the at least one strap is configured to be attached to the at least one person attachment point when the harness is outside of the flight chamber.

16. The wind tunnel according to claim 13, further comprising:
at least one net arranged across a cross section of the wind tunnel that is downstream of the flight chamber.

17. The wind tunnel according to claim 13, wherein the at least one strap is configured to be attached to the at least one tunnel attachment point via a slidable connection to at least one slide track device including at least one rope, wire or rail that is connected to at least two tunnel attachment points so that the slidable connection is able to slide along the slide track device.

18. The wind tunnel according to claim 17, wherein the at least one rope, wire or rail is connected to the at least one tunnel attachment point via an elastic connection that urges the at least one rope, wire or rail towards the at least one tunnel attachment point.

* * * * *